United States Patent
Sugiki et al.

(10) Patent No.: US 7,197,930 B2
(45) Date of Patent: Apr. 3, 2007

(54) GYRO SENSOR

(75) Inventors: Mikio Sugiki, Toyokawa (JP); Yuji Kutsuna, Oobu (JP); Hajime Ito, Ichinomiya (JP); Takao Tsuruhara, Oobu (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/291,085

(22) Filed: Dec. 1, 2005

(65) Prior Publication Data

US 2006/0117850 A1 Jun. 8, 2006

(30) Foreign Application Priority Data

Dec. 2, 2004 (JP) .............................. 2004-349924

(51) Int. Cl.
*G01P 15/00* (2006.01)
*G01P 9/04* (2006.01)

(52) U.S. Cl. .............................. 73/504.12; 73/504.04; 73/504.15

(58) Field of Classification Search ............. 73/504.02, 73/504.04, 504.12, 504.15, 504.16
See application file for complete search history.

(56) References Cited

U.S. PATENT DOCUMENTS

| | | | |
|---|---|---|---|
| 6,220,094 B1 * | 4/2001 | Ichinose et al. ......... | 73/504.16 |
| 6,584,841 B1 * | 7/2003 | Ichinose et al. ......... | 73/504.12 |
| 6,907,784 B2 * | 6/2005 | Kato ....................... | 73/514.15 |
| 7,069,783 B2 * | 7/2006 | Uehara .................... | 73/514.12 |

FOREIGN PATENT DOCUMENTS

JP 5-334888 12/1993

* cited by examiner

*Primary Examiner*—Helen Kwok
(74) *Attorney, Agent, or Firm*—Posz Law Group, PLC

(57) ABSTRACT

The gyro sensor uses a clock signal as a timing signal or synchronous signal for reading various data stored in a built-in memory for its yaw rate sensing operation. The gyro sensor is configured to use, as such a clock signal, the self-excited oscillation signal being applied to the vibrator of the gyro sensor as a vibrator drive signal.

10 Claims, 3 Drawing Sheets

WAVEFORMS AT POSITIONS (1), (3), (5)

PHASE (DEGREES)

WAVEFORMS AT POSITIONS (2), (4), (6), (7), (8)

PHASE (DEGREES)

GYRO SENSOR

CROSS-REFERENCE TO RELATED APPLICATION

This application is related to Japanese Patent Application No. 2004-349924 filed on Dec. 2, 2004, the contents of which are hereby incorporated by reference.

BACKGROUND OF THE INVENTION

1. Field of the Invention

The present invention relates to a gyro sensor of the type using a clock signal as a timing signal or synchronous signal for reading various data stored in a built-in memory for its sensing operation.

2. Description of Related Art

In a gyro sensor configured to read, on a time divisional basis, data for its sensing operation from a built-in memory such as an EPROM, it is common that a clock signal is used as a timing signal for reading the data. Generally, such a clock signal is produced by a built-in CR oscillation circuit (refer to Japanese Patent Application Laid-open No. 05-334888, for example). Accordingly, such a gyro sensor needs a large chip area for forming a sensor-circuit part thereof, because the sensor-circuit part must include a CR oscillation circuit. This becomes a cause of high production cost and large size of the gyro sensor of this type.

SUMMARY OF THE INVENTION

The invention provides a gyro sensor including:

a vibrator vibrating in a first direction when the vibrator is applied with a vibrator drive signal through a first sensing element provided in the vibrator, the vibrator being provided with a second sensing element outputting a vibration detection signal representing a magnitude of vibration of the vibrator in the first direction, and a third sensing element outputting a yaw detection signal representing a magnitude of vibration of the vibrator in a second direction when the vibrator is vibrating in the first direction; and a sensor-circuit part applying the vibrator drive signal to the first sensing element;

the sensor-circuit part including:

a vibrator driving section processing the voltage detection signal outputted from the second sensing element to generate the vibrator drive signal;

a yaw detecting section processing the yaw detection signal outputted from the third-sensing element to generate a sensor signal representing a rate of yaw applied to the gyro sensor;

a data storage section storing data necessary for processing the voltage detection signal and the yaw detection signal in the vibrator driving section and the yaw detecting section, respectively; and data reading circuit reading the data from the data storage section and transferring the read data to the vibrator driving section and the yaw detecting section in synchronization with a clock signal, wherein one of the vibrator driving signal being applied to the first sensing element, the vibration detection signal being outputted from the second sensing element, the vibration detection signal being processed by the vibrator driving section, the yaw detecting signal being outputted from the third sensing element, and the yaw detection signal being processed by the yaw detecting section is used as the clock signal.

The gyro sensor according to this invention can be made simpler in configuration and can be manufactured at a lower cost than the conventional gyro sensor, because the gyro sensor according to this invention does not require any specific oscillation circuit for generating the clock signal, and accordingly, the chip area necessary for forming the sensor-circuit part thereof can be small.

PREFERRED EMBODIMENTS OF THE INVENTION

Figure 1:
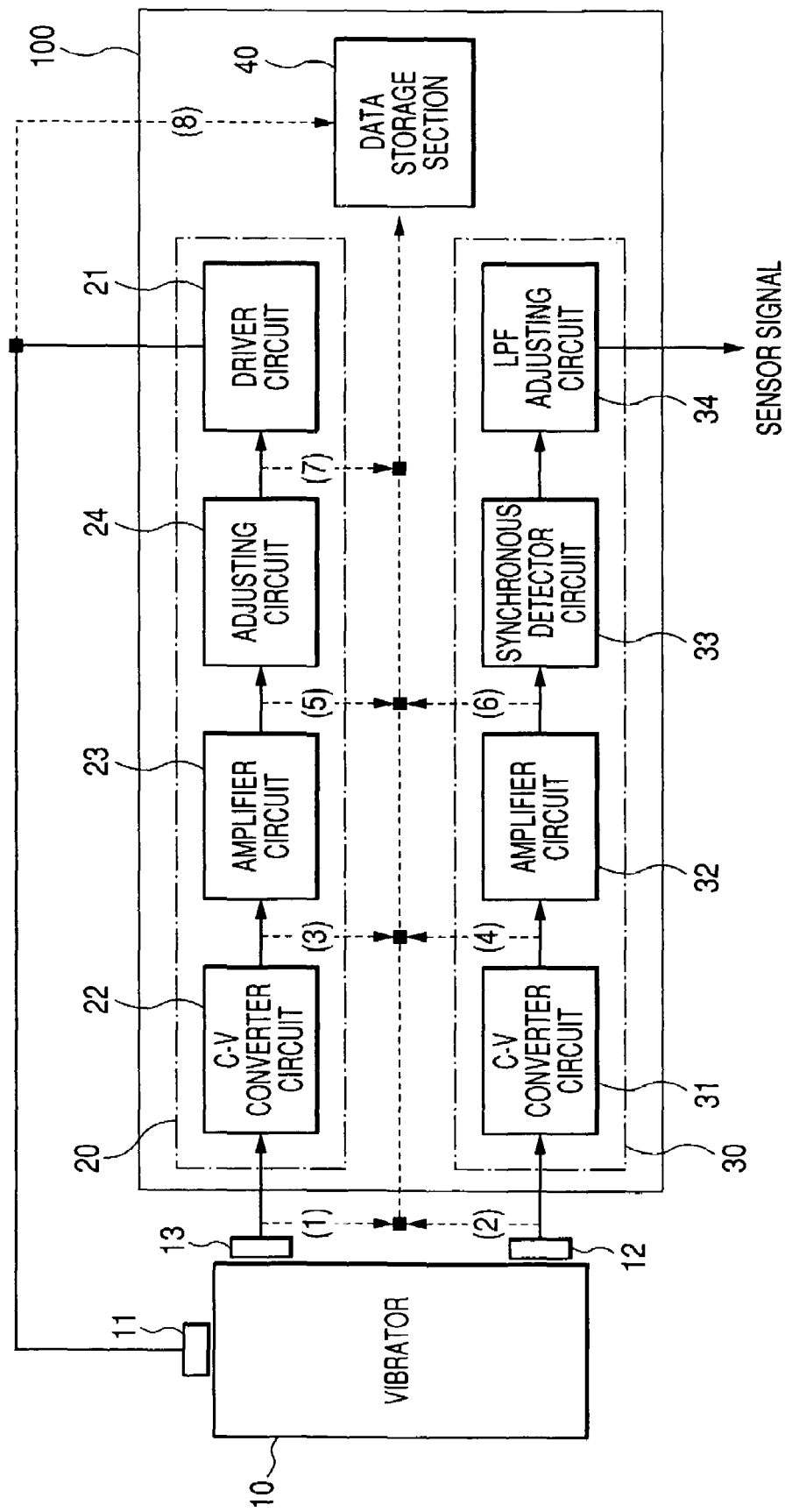
FIG. 1 is a block diagram showing a configuration of a gyro sensor according to an embodiment of the invention.

FIG. 1 is a block diagram showing a configuration of a gyro sensor according to an embodiment of the invention.

As shown in this figure, the gyro sensor is constituted by a vibrator 10 and a sensor-circuit part 100. The sensor-circuit part 100 includes a vibrator driving section 20, a yaw detecting section 30, and a data storage section 40.

The vibrator 10 is provided with a driving element (electrode) 11, a vibration detecting element (electrode) 13, and a yaw sensing element (electrode) 12. When yaw occurs while the vibrator 10 is vibrating under the action of the driving element 11 in a predetermined direction (referred to as "driving direction" hereinafter), the vibrator 10 develops a vibration in a direction orthogonal to the driving direction (referred to as "sensing direction" hereinafter) by the Coriolis force. The vibration in the sensing direction is detected by the yaw sensing element 12. The vibrator 10 is also configured to output, through the vibration detecting element 13, a vibration detection signal (capacitance signal in this embodiment) reflecting the vibrating state of the vibrator 10 in the driving direction so that the vibrator driving section 20 can properly adjust the amplitude and phase of its output signal (vibrator drive signal) applied to the driving element 11.

The vibrator driving section 20 includes a C-V (Capacitance to Voltage) converter circuit 22, an amplifier circuit 23, an adjusting circuit 24, and a driver circuit 21.

The driver circuit 21 generates the vibrator drive signal by stepping up a feed back signal coming through the C-V converter circuit 22, amplifier circuit 23, and adjusting circuit 24 as explained below.

The C-V converter circuit 22 converts a capacitance signal outputted, as the vibration detection signal, from the vibration detecting element 13 into a voltage signal. The capacitance signal represents a capacitance between the vibration detecting element 13 and the vibrator 10, which varies as the vibrator 10 vibrates in the driving direction.

The amplifier circuit 23 amplifies the voltage signal (vibration detection signal) outputted from the C-V converter circuit 22.

The adjusting 24 circuit adjusts the amplitude and phase of the voltage signal outputted from the amplified circuit 23, which is supplied to the driver circuit 21 as the feedback signal, for keeping the amplitude of the vibrator drive signal at a certain level, and also keeping the vibrator drive signal and the vibration detection signal in synchronous with each other.

Thus, the vibrator 10 vibrates at a constant amplitude and at a constant frequency.

The yaw detecting section 30 includes a C-V converter circuit 31, an amplifier circuit 32, a synchronous detector circuit 33, and an LPF adjusting circuit 34.

The C-V converter circuit 31 converts a capacitance signal outputted, as a yaw detection signal, from the sensing element 12 into a voltage signal. The capacitance signal represents a capacitance between the sensing element 12 and the vibrator 10, which varies as the vibrator 10 vibrates in the sensing direction.

The vibrator 10 may be provided with a pair of the yaw sensing elements 12 facing opposite sides thereof, and a pair of the vibration detecting elements 13 facing another opposite sides thereof. In this case, each of the C-V converter circuits 22 and 31 can be constituted by two charge amplifiers converting the capacitance signals outputted from the element pair into complementary voltage signals.

The voltage signal (yaw detection signal) outputted from the C-V converter circuit 31 is amplified by the amplifier circuit 32 having a predetermined gain. When the C-V converter circuit 31 is constituted by the two charge amplifiers, the amplifier circuit 32 may be a differential amplifier amplifying the difference of the voltage signals outputted from the two charge amplifiers.

The synchronous detector circuit 33 removes noise components from the yaw detection signal amplified by the amplifier circuit 32. The synchronous detector circuit 33 may be configured to allow only a component having the same frequency as the vibrator driving signal adjusted by the adjusting circuit 24 to pass.

The LPF adjusting circuit 34 extracts, as a sensor signal (output sensor signal of the gyro sensor), a low-frequency component from the yaw detection signal outputted from the synchronous detector circuit 33. Since the sensor signal is susceptible to the output offset voltage drift and the temperature characteristics of the circuits constituting the gyro sensor, the LPF adjusting circuit 34 may be provided with a zero-adjustment/ temperature-correction circuit.

The data storage section 40 stores various data used by the circuits included in the sensor-circuit part 100 of the gyro sensor. For example, the data storage section 40 stores data specifying the gains of the amplifier circuits 23, 32, and data used for setting adjusting constants in the LPF adjusting circuit 34.

Figure 2A:
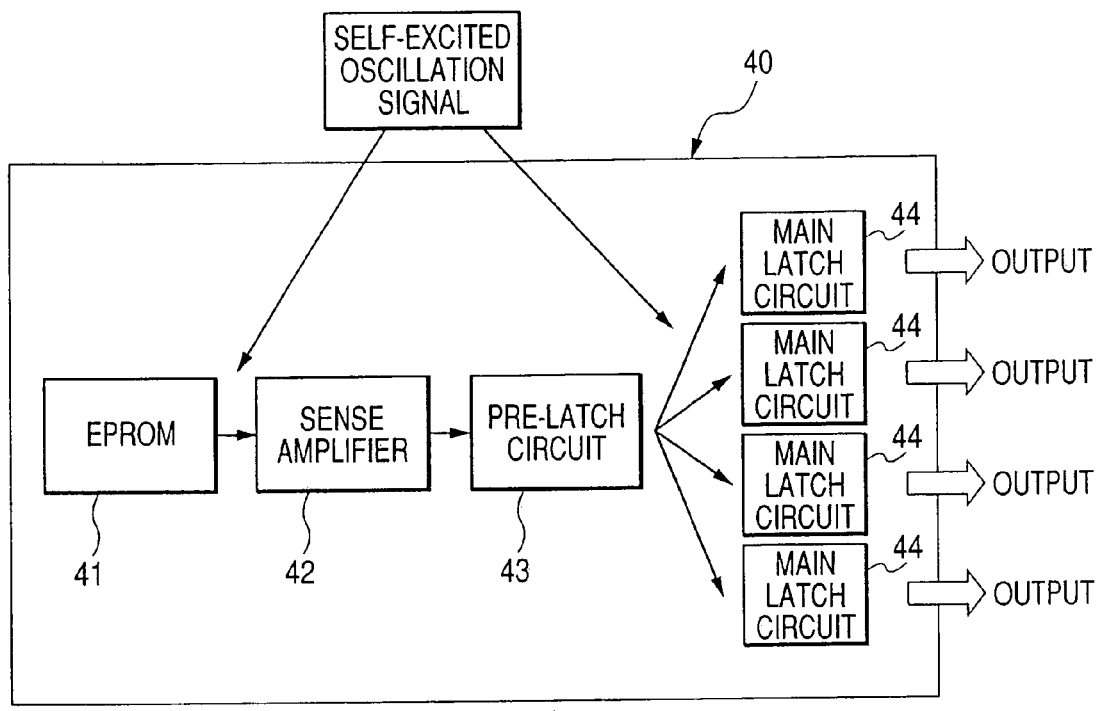
FIG. 2A is a block diagram showing an internal structure of a data storage section included in a sensor-circuit part of the gyro sensor according to the embodiment of the invention.
Figure 2B:
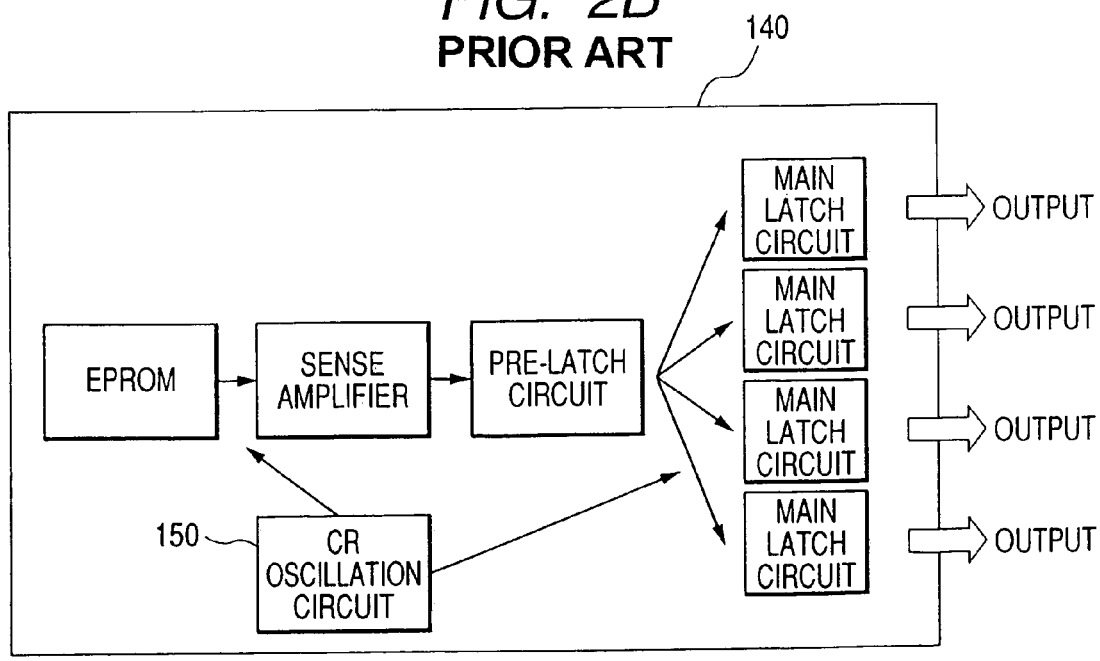
FIG. 2B is a block diagram showing an internal structure of a data storage section included in a sensor-circuit part of a conventional gyro sensor.

FIG. 2A is a block diagram showing an internal structure of the data storage section 40 included in the sensor-circuit part 100 of the gyro sensor according to this embodiment. FIG. 2B is a block diagram showing an internal structure of a data storage section 140 conventionally used for a gyro sensor of the type described here. As shown in FIG. 2B, the data storage section 140 has a CR oscillation circuit 150 built therein.

As shown in FIG. 2A, the data storage section 40 includes an EPROM 41, a sense amplifier 42, a pre-latch circuit 43, and main latch circuits 44.

The various data used by the circuits included in the sensor-circuit part 100 are contained in the EPROM 41. The sense amplifier 42 is for reading the data from the EPROM 41. The data read by the sense amplifier 42 are temporarily stored in the pre-latch circuit 43. The main latch circuits 44, each of which is connected to a specific one of the circuits constituting the sensor-circuit part 100, are for outputting the data temporarily stored in the pre-latch circuit 43 to desired ones of the circuits. The sense amplifier 42, pre-latch circuit 43, and main latch circuits 44 constitute a data reading circuit.

In the data storage section 40, a clock signal is used as a timing signal when the sense amplifier 42 reads the data from the EPROM 41, and when the data temporarily stored in the pre-latch circuit 43 is transferred to the main latch circuits 44. In this embodiment, the output signal of one of the circuits constituting the vibrator driving section 20 or the yaw detecting section 30 is used as such a clock signal. That is, in this embodiment, the self-excited signal circulating in the vibrator driving section 20 or the yaw detecting section 30 is used as the clock signal.

Thus, the gyro sensor of this embodiment does not require any specific oscillation circuit generating the clock signal such as the CR oscillation circuit 150 in the conventional gyro sensor.

The following is an explanation about the self-excited oscillation signal.

Figure 3A:
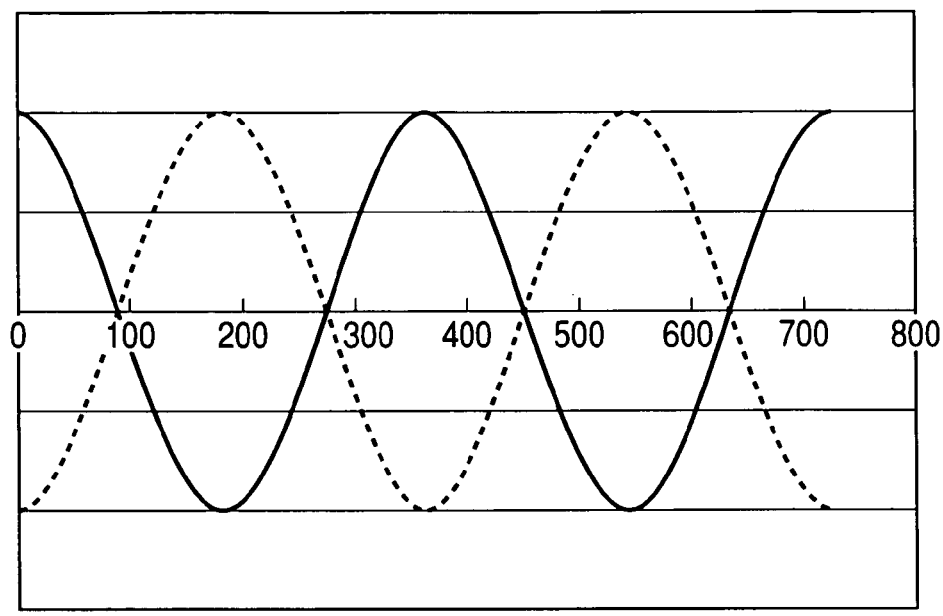
FIGS. 3A and 3B are diagrams showing waveforms of signals appearing at various positions in the sensor-circuit part of the gyro sensor according to the embodiment of the invention.
Figure 3B:
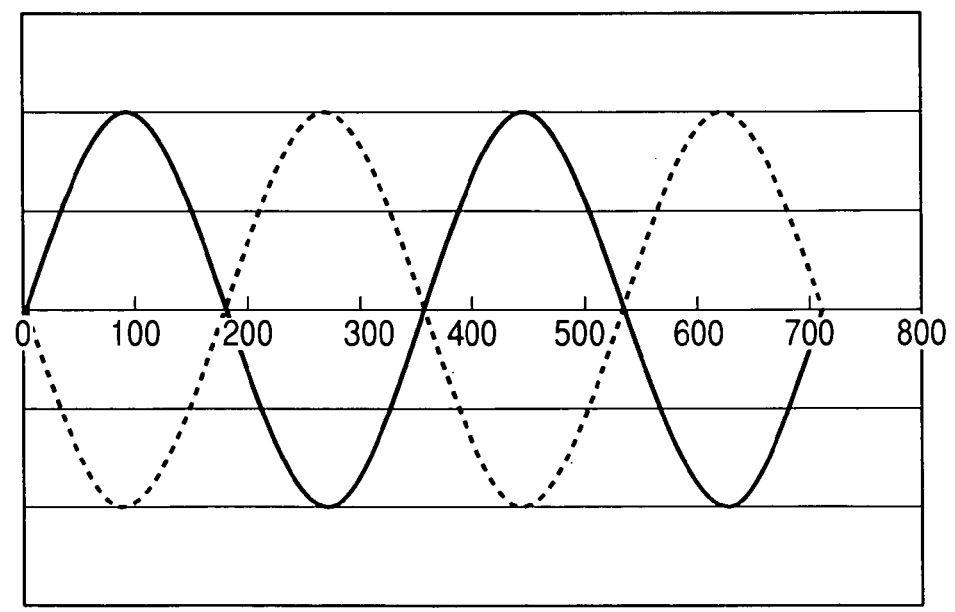

The signals appearing at the positions (1), (3), (5) shown in FIG. 1 have a waveform as represented by the solid line or the dashed line (phase-inverted line) shown in FIG. 3A. The signals appearing at the positions (2), (4), (6), (7), (8) shown in FIG. 1 have a waveform as represented by the solid line or the dashed line (phase-inverted line) shown in FIG. 3B.

In this embodiment, one of the signals appearing at the positions (1) to (8) is used as the self-excited signal. It should be understood that although the signals appearing at the positions (1) to (8) are all sinusoidal, their amplitudes may be different.

A comparator comparing the self-excited signal with a predetermined threshold may be provided for converting the sinusoidal self-excited signal into a rectangular clock signal as necessary.

The gyro sensor according to this embodiment can be made simpler in configuration and can be manufactured at lower cost than the conventional gyro sensor, because the gyro sensor according to this embodiment does not require any specific oscillation circuit for generating the clock signal, and accordingly, the chip area necessary for forming the sensor-circuit part thereof can be small.

The gyro sensor of this embodiment may be provided with a voltage level diagnostic circuit in the vibrator driving section 20 or the yaw detecting section 30 for regularly checking the voltage level in the sensor-circuit part 40. In this case, the output signal of the voltage level diagnostic circuit may be also used as the self-excited oscillation signal (clock signal).

The above explained preferred embodiments are exemplary of the invention of the present application which is described solely by the claims appended below. It should be understood that modifications of the preferred embodiments may be made as would occur to one of skill in the art.

What is claimed is:

1. A gyro sensor comprising:
   a vibrator vibrating in a first direction when said vibrator is applied with a vibrator drive signal through a first sensing element provided in said vibrator, said vibrator being provided with a second sensing element outputting a vibration detection signal representing a magnitude of vibration of said vibrator in said first direction, and a third sensing element outputting a yaw detection signal representing a magnitude of vibration of said vibrator in a second direction when said vibrator is vibrating in said first direction; and a sensor-circuit part applying said vibrator drive signal to said first sensing element;

said sensor-circuit part including:

a vibrator driving section processing said vibration detection signal outputted from said second sensing element to generate said vibrator drive signal;

a yaw detecting section processing said yaw detection signal outputted from said third sensing element to generate a sensor signal representing a rate of yaw applied to said gyro sensor;

a data storage section storing data necessary for processing said vibration detection signal and said yaw detection signal in said vibrator driving section and said yaw detecting section, respectively; and data reading circuit reading said data from said data storage section and transferring said read data to said vibrator driving section and said yaw detecting section in synchronization with a clock signal, wherein one of said vibrator drive signal being applied to said first sensing element, said vibration detection signal being outputted from said second sensing element, said vibration detection signal being processed by said vibrator driving section, said yaw detection signal being outputted from said third sensing element, and said yaw detection signal being processed by said yaw detecting section is used as said clock signal.

2. The gyro sensor according to claim 1, wherein said vibration detection signal being outputted from said second sensing element is used as said clock signal in said data storage section.

3. The gyro sensor according to claim 1, wherein said vibrator driving section includes a capacitance-voltage converter circuit converting a capacitance signal outputted from said second sensing element as said vibration detection signal into a voltage signal, said voltage signal is used as said clock signal in said data storage section.

4. The gyro sensor according to claim 3, wherein said vibrator driving section includes an amplifier circuit amplifying said voltage signal outputted from said capacitance-voltage converter circuit, said voltage signal amplified by said amplifier circuit being used as said clock signal in said data storage section.

5. The gyro sensor according to claim 4, wherein said vibrator driving section includes a driver circuit generating said vibrator drive signal by stepping up a feedback signal, and an adjustment circuit generating said feedback signal by adjusting a phase and an amplitude of said voltage signal amplified by said amplifier circuit so as to keep said vibrator drive signal at a predetermined amplitude level and in synchronous with said vibration detection signal outputted from said second sensing element.

6. The gyro sensor according to claim 1, wherein said yaw detection signal outputted from said third sensing element is used as said clock signal in said data storage section.

7. The gyro sensor according to claim 1, wherein said yaw detecting section includes a capacitance-voltage converter circuit converting a capacitance signal outputted from said third sensing element as said yaw detection signal into a voltage signal, said voltage signal is used as said clock signal in said data storage section.

8. The gyro sensor according to claim 7, wherein said yaw detecting section includes an amplifier circuit amplifying said voltage signal outputted from said capacitance-voltage converter circuit, said voltage signal amplified by said amplifier circuit being used as said clock signal in said data storage section.

9. The gyro sensor according to claim 1, wherein said vibrator drive signal being applied to said first sensing element is used as said clock signal in said data storage section.

10. The gyro sensor according to claim 1, wherein said second direction is orthogonal to said first direction.

* * * * *